(12) United States Patent
Yano et al.

(10) Patent No.: US 6,200,700 B1
(45) Date of Patent: Mar. 13, 2001

(54) ALKALINE SECONDARY BATTERY

(75) Inventors: Mutsumi Yano, Hirakata; Mitsunori Tokuda, Osaka; Mitsuzou Nogami, Tokushima; Shin Fujitani; Koji Nishio, both of Hirakata, all of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/272,399

(22) Filed: Mar. 19, 1999

(30) Foreign Application Priority Data

Mar. 23, 1998 (JP) .................................................. 10-074266

(51) Int. Cl.[7] ...................................................... H01M 2/02
(52) U.S. Cl. ........................... 429/165; 429/163; 429/166; 429/229; 429/223
(58) Field of Search .................................. 429/229, 163, 429/165, 166, 223

(56) References Cited

U.S. PATENT DOCUMENTS 3,893,870 * 7/1975 Kozawa ................................ 429/229
5,626,988 * 5/1997 Daniel-Ivad et al. ................ 429/229

FOREIGN PATENT DOCUMENTS 45-3570   2/1970 (JP) .
45-4254   2/1970 (JP) .
45-17332  6/1970 (JP) .

OTHER PUBLICATIONS

Kordesch, K. V., Batteries, Marcel Dekker, Inc., vol. 1, New York, 1974, pp. 256–261.

* cited by examiner

Primary Examiner—Laura Weiner
(74) Attorney, Agent, or Firm—Armstrong, Westerman, Hattori, McLeland & Naughton, LLP

(57) ABSTRACT

The present invention is directed to an alkaline secondary battery comprising a positive electrode, a zinc based negative electrode, and an alkaline electrolyte solution, wherein the positive electrode includes a central cavity for receiving the zinc based negative electrode, and the negative electrode includes a central cavity for holding the alkaline electrolyte solution. The battery is arranged such that the positive electrode presents a smaller capacity than the negative electrode at least in an initial charge/discharge period.

10 Claims, 2 Drawing Sheets

ALKALINE SECONDARY BATTERY

BACKGROUND OF THE INVENTION

1. Field of the Invention

The present invention relates generally to an alkaline secondary battery including a positive electrode, a negative electrode and an alkaline electrolyte solution, and particularly to an alkaline secondary battery which employs zinc as a negative electrode material for use in the negative electrode and which provides satisfactory charge/discharge cycle performance in a case where the positive electrode is adapted to present a smaller capacity than the negative electrode at least in an initial charge/discharge period and the negative electrode contains zinc in an increased proportion for increase in the battery capacity.

2. Description of the Related Art

Heretofore, the alkaline secondary batteries have employed various materials as the negative electrode material for use in the negative electrode.

An alkaline secondary battery of high energy density is obtained by the use of zinc with a small electrochemical equivalent and electrode potential as the negative-electrode material. In this connection, various studies have long been made on the alkaline secondary batteries employing zinc as the negative-electrode material.

There has been disclosed in Japanese Examined Patent Publication No.45(1970)-3570 an alkaline secondary battery of a so-called inside-out construction which includes a cylindrical positive electrode with a central cavity, and a negative electrode comprised of a bar-like negative-electrode current collector and a zinc layer, as the negative-electrode material, formed around the current collector, the negative electrode received by the central cavity of the positive electrode (so called outside-positive electrode cell).

The alkaline secondary battery of such an inside-out construction features a high energy density by virtue of a great amount of negative-electrode and positive-electrode materials contained in the battery. Unfortunately, repeated charge/discharge cycles result in shortage of the alkaline electrolyte solution in the zinc based negative electrode. Consequently, the battery is lowered in the charge/discharge cycle performance.

As a solution to this problem, Japanese Examined Patent Publications No.45(1970)-4254 and No.45(1970)-17332 have proposed alkaline secondary batteries of inside-out construction which each include a cavity for holding the alkaline electrolyte solution or water to be fed to the negative electrode, thereby achieving improved charge/discharge cycle performance.

However, in a case where the cavity for holding the alkaline electrolyte solution or water is disposed above the negative electrode as suggested by Japanese Examined Patent Publication No.45(1970)-4254, the negative electrode is not sufficiently supplied with the alkaline electrolyte solution at a portion around the negative-electrode current collector which is spaced away from the positive electrode. Consequently, the battery fails to achieve an adequate improvement in the charge/discharge cycle performance.

It is to be noted that the alkaline secondary batteries disclosed in the above official gazettes employ manganese dioxide as the positive electrode material for use in the positive electrode.

Unfortunately, manganese dioxide has a poor reversibility of the charge/discharge reaction process. Hence, such an alkaline secondary battery normally restricts the capacity of the zinc based negative electrode within the range of a chargeable/dischargeable capacity of the manganese-dioxide based positive electrode. As a result, a satisfactory battery capacity cannot be obtained.

On this account, the current trend of the alkaline secondary battery is to use nickel hydroxide as the positive electrode material for use in the positive electrode. In a case where nickel hydroxide, having a superior charge/discharge characteristic to manganese dioxide, is used as the positive electrode material, the capacity of the positive electrode may be restricted within the range of a chargeable/dischargeable capacity of the zinc based negative electrode. Thus, the satisfactory charge/discharge capacity may be obtained by increasing the amount of zinc contained in the negative electrode.

The charge/discharge reaction process occurring in the battery having the nickel-hydroxide based positive electrode is expressed by the following chemical formula, wherein the discharge reaction process involves the loss of water in the alkaline electrolyte solution:

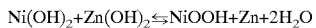

$$Ni(OH)_2 + Zn(OH)_2 \leftrightarrows NiOOH + Zn + 2H_2O$$

Accordingly, the alkaline secondary battery employing nickel hydroxide as the positive electrode material has a detrimental tendency of suffering shortage of the alkaline electrolyte solution during the discharge process. In the negative electrode, on the other hand, a zinc dissolution/deposition process takes place in conjunction with the charge/discharge reaction process. Thus, in conjunction with repeated charge/discharge processes, the repeated zinc dissolution/deposition processes cause gaps between zinc particles to become blocked and passivated. This interferes with permeation of the alkaline electrolyte solution into the negative electrode, resulting in a battery capacity decline. Particularly, in the case of the alkaline secondary battery of inside-out construction with the negative electrode containing the increased amount of zinc for achieving the sufficient charge/discharge capacity, a serious decline in the battery capacity results from the zinc passivation resulting from the charge/discharge process. As a result, the alkaline secondary battery is lowered in the charge/discharge cycle performance.

SUMMARY OF THE INVENTION

One objective of the invention is an alkaline secondary battery of inside-out construction in which a zinc based negative electrode is received by a central cavity of a positive electrode, the battery being adapted to prevent the shortage of alkaline electrolyte solution during the charge/discharge process and the decline in the battery capacity resulting from the zinc passivation which may occur in the charge/discharge process.

Another objective of the invention is the alkaline secondary battery of inside-out construction in which the zinc based negative electrode is received by the central cavity of the positive electrode, the battery ensuring the sufficient battery capacity and the excellent charge/discharge cycle performance.

The alkaline secondary battery according to the invention comprises a positive electrode, a zinc based negative electrode and an alkaline electrolyte solution, the positive electrode including a central cavity for receiving the zinc based negative electrode, the negative electrode including a central cavity for holding the alkaline electrolyte solution, the positive electrode presenting a smaller capacity than the negative electrode at least in an initial charge/discharge period.

If the alkaline secondary battery has the inside-out construction wherein the positive electrode includes the central cavity for receiving the zinc based negative electrode, as suggested by the invention, an increased amount of zinc may be contained in the negative electrode. This ensures the sufficient battery capacity when the positive electrode employs nickel hydroxide as the positive-electrode material and has a capacity thereof restricted within the range of a chargeable/dischargeable capacity of the negative electrode.

If the negative electrode includes the central cavity for holding the alkaline electrolyte solution, as suggested by the alkaline secondary battery of the invention, the alkaline electrolyte solution will not run short during the discharge process. In addition, the negative electrode is sufficiently supplied with the alkaline electrolyte solution at the central portion thereof, which is spaced away from the positive electrode. Thus is prevented the zinc passivation leading to the battery capacity decline and hence, the charge/discharge cycle performance is improved.

If, in the negative electrode, the central cavity for holding the alkaline electrolyte solution has too great a volume, the negative electrode can contain a decreased amount of zinc and hence, the sufficient battery capacity cannot be attained. If, on the other hand, this central cavity is insufficient in volume, the cavity can hold a decreased amount of alkaline electrolyte solution, failing to sufficiently supply the negative electrode with the alkaline electrolyte solution. Thus, the lowered charge/discharge cycle performance results. Accordingly, the ratio (=V2/V1) of a volume V2 of the cavity for holding the alkaline electrolyte solution to a volume V1 of the negative electrode minus the cavity for holding the alkaline electrolyte solution is preferably in the range of 0.10 to 0.60.

In a case where a negative-electrode current collector is disposed on an inside surface of the negative electrode which surface defines the cavity for holding the alkaline electrolyte solution, the negative-electrode current collector should permit the alkaline electrolyte solution to pass bi-directionally therethrough, thereby feeding the alkaline electrolyte solution to the inside portion of the negative electrode. For instance, the current collector may be formed of a cylindrical metal sheet formed with holes permitting the bi-directional passage of the alkaline electrolyte solution.

Where the negative-electrode current collector is disposed circumferentially within the negative electrode, the negative-electrode current collector is preferably plated with indium for prevention of hydrogen gas evolution which occurs in the negative electrode and results in the self-discharge.

If a small gap is defined between the positive electrode and the zinc based negative electrode received by the aforesaid cavity of the positive electrode, a decreased amount of alkaline electrolyte solution is poured into the alkaline secondary battery. If, on the other hand, the gap between the positive electrode and the negative electrode is too great, a decreased amount of negative-electrode and positive-electrode materials is packed in the alkaline secondary battery. This results in a decreased battery capacity. Accordingly, the ratio (=d/D) of an outside diameter d of the negative electrode to an inside diameter D of the positive electrode is preferably satisfies the following condition:

$$0.58 < d/D < 0.76.$$

In the alkaline secondary battery according to the invention, the positive electrode may employ the positive-electrode material generally used in the alkaline secondary batteries, such as manganese dioxide, nickel hydroxide and the like. For enhancement of the charge/discharge capacity of this alkaline secondary battery, it is preferred that the positive electrode employs nickel hydroxide as the positive-electrode material and has its capacity restricted within the range of a chargeable/dischargeable capacity of the negative electrode whereas the negative electrode contains an increased amount of zinc. For achievement of the sufficient charge/discharge capacity and prevention of the oxygen evolution in the charge process, it is particularly preferred to use such a positive-electrode material as has a crystal structure which is transformed into a γ-NiOOH structure when charged.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

The following examples specifically illustrate the alkaline secondary battery according to the invention with reference to the accompanying drawing. Further, comparative examples are given to clarify that the alkaline secondary batteries of examples hereof present excellent charge/discharge performance. It is to be noted that the alkaline secondary battery according to the invention is not limited to the following examples but variations and modifications thereto may be made within the scope and spirit of the invention.

EXAMPLES 1 TO 8

Figure 1:
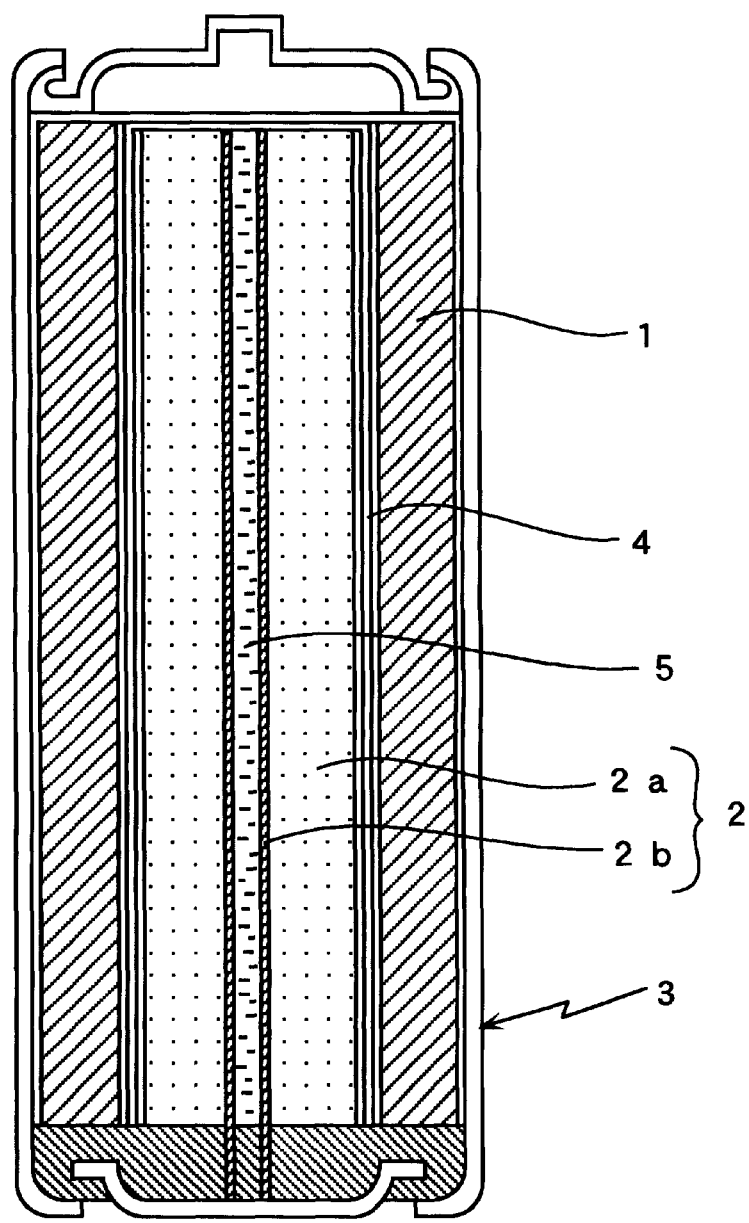
FIG. 1 is a schematic sectional view showing an internal construction of an alkaline secondary battery according to an embodiment of the invention.

In Examples 1 to 8, a positive electrode and a negative electrode were prepared in the following manners and were used for fabrication of an AA-size alkaline secondary battery of inside-out type construction as shown in FIG. 1.
(Preparation of Positive Electrode)

The positive electrode was prepared in the following manner. To a solution mixture containing 0.2 mol/l nickel sulfate and 0.1 mol/l manganese sulfate, there was added a solution mixture containing 10% ammonia and 10% sodium hydroxide. The pH of the resultant solution mixture was adjusted to 10.0±0.4 thereby to obtain a precipitate. The precipitate was filtered off and then was kept in a 20% KOH aqueous solution at room temperature for one week. Subsequently, the precipitate was washed and filtered off, thereby to obtain the positive-electrode material.

The X-ray diffraction (XRD) was used to study a crystal structure of the positive-electrode material to find that this material had an α-Ni(OH)$_2$ crystal structure. On the other hand, the positive-electrode material was studied by using the electron probe microanalysis (EPMA). It was determined that this α-Ni(OH)$_2$ formed a solid solution with manganese. Further, the positive-electrode material was analyzed by atomic absorption spectrometry to determine that manganese was contained in a concentration of 25 wt % based on total weight of nickel and manganese.

Subsequently, 10 wt % NaClO aqueous solution was adjusted to maintain pH 12 by adding sodium hydroxide. In this aqueous solution, the aforesaid solid solution α-Ni(OH)$_2$ incorporating manganese was subject to an oxidation treatment in which the aforesaid α-Ni(OH)$_2$ was oxidized to γ-NiOOH.

Then, 45 parts by weight of α-Ni(OH)$_2$ thus obtained, 45 parts by weight of γ-NiOOH thus obtained, and 10 parts by weight of graphite were mixed together and was press-molded into a cylindrical positive electrode 1 having an outside diameter of 13.3 mm, an inside diameter of 10.3 mm and a height of 13.5 mm, as shown in FIG. 1.

(Preparation of Negative Electrode)

Preparatory to the preparation of the negative electrode, a negative electrode mixture was prepared in the following manner. Zn and ZnO or Zn(OH)$_2$ were mixed together in a weight ratio of 2:1. To this mixture, 2.5 wt % of In$_2$O$_3$ for suppressing the hydrogen gas evolution, 1.0 wt % of carboxymethylcellulose as a binder, and 0.5 wt % of polytetrafluoroethylene were added. A suitable amount of water was added to this mixture such that a weight ratio of water was about ⅓ based on negative-electrode material. The resultant mixture was kneaded thereby to obtain the negative electrode mixture.

Then, an indium-plated copper lath was used as the negative-electrode current collector. This negative-electrode current collector was wound around each core bar of each predetermined diameter. The aforesaid negative electrode mixture was press-fitted around each current collector and then, the core bar was removed to give a cylindrical negative electrode 2 with a negative-electrode mixture layer 2a formed around the negative-electrode current collector 2b, as shown in FIG. 1.

In Examples 1 to 8, the diameter of the core bar and the thickness of the negative electrode mixture press-fitted over the negative-electrode current collector were varied thereby to obtain the negative electrodes of the respective examples with the outside diameters and inside diameters shown in Table 1 as below. For each of the negative electrodes thus obtained, the ratio (=V2/V1) of a volume V2 of the central cavity of the negative electrode to a volume V1 of the negative electrode minus the central cavity thereof was determined. The results are shown in Table 1 as below.

(Fabrication of Battery)

The battery was fabricated in the following manner. As shown in FIG. 1, the cylindrical positive electrode pieces 1, stacked in three layers, were placed circumferentially within a battery case 3. A separator 4 formed of laminated cellophane and a vinylon unwoven fabric was inserted in the positive electrode with the vinylon unwoven fabric contacting the positive electrode. Each of the aforesaid negative electrodes 2 was placed circumferentially within the positive electrode 1 with the separator 4 interposed therebetween. In this state, an alkaline electrolyte solution 5 composed of 40 wt % KOH aqueous solution was poured into each battery case 3 until the positive electrode 1 and the negative electrode 2 were completely immersed therein. Thus, the positive electrode 1 and negative electrode 2 were impregnated with the alkaline electrolyte solution 5 while the alkaline electrolyte solution 5 was allowed to fill gaps on an interior circumferential side of the negative electrode and between the positive electrode 1 and the negative electrode 2. Thereafter, each of the battery cases 3 was sealed and thus was completed an AA-size alkaline secondary battery with a battery capacity of about 1000 mAh in accordance with each of Examples 1 to 8.

For each of the alkaline secondary batteries thus fabricated, the ratio (=d/D) of an outside diameter d of the negative electrode to an inside diameter D of the positive electrode was determined. On the other hand, a theoretical capacity Qc of the positive electrode and a theoretical capacity Qa of each negative electrode were calculated so as to find a ratio (=Qa/Qc) of the theoretical capacity Qa of each negative electrode to the theoretical capacity Qc of the positive electrode. Further, an amount of alkaline electrolyte solution poured into each alkaline secondary battery was determined. The results are shown in Table 1 as below. The ratio (=Qa/Qc) of the theoretical capacity Qa of each negative electrode to the theoretical capacity Qc of the positive electrode was determined as follows. A content of α-Ni(OH)$_2$ and γ-NiOOH in the positive electrode was calculated on an α-Ni(OH)$_2$ basis to determine that each of the aforesaid alkaline secondary batteries contained 3.6 g of α-Ni(OH)$_2$. Given that α-Ni(OH)$_2$ had a theoretical capacity per unit weight of 289 mAh/g, the theoretical capacity of the positive electrode was determined to be 1040 mAh. As to the negative electrode, contents of Zn and ZnO were determined based on weight. The theoretical capacity Qa of each negative electrode was determined by using the contents of Zn and ZnO thus determined, a per-unit-weight theoretical capacity of Zn at 820 mAh/g, and a per-unit-weight theoretical capacity of ZnO at 658 mAh/g.

COMPARATIVE EXAMPLES 1 TO 3

Figure 2:
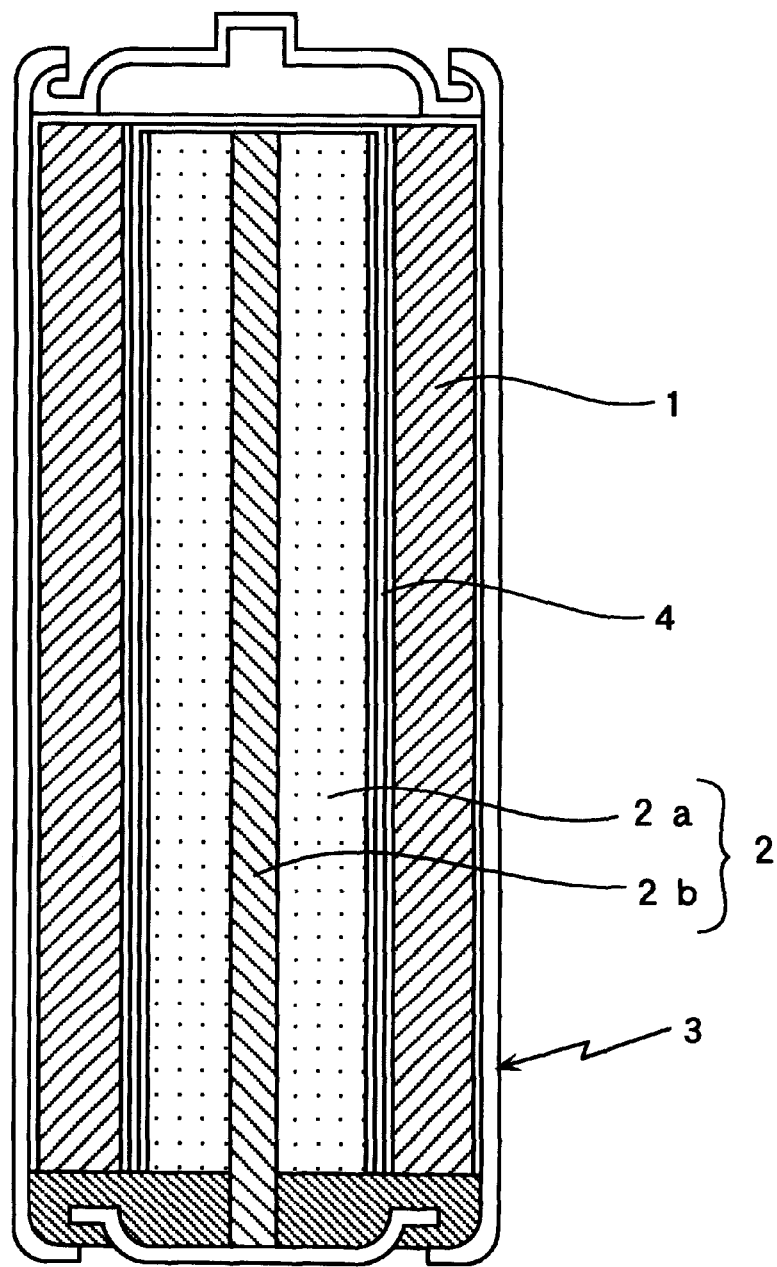
FIG. 2 is a schematic sectional view showing an internal construction of an alkaline secondary battery according to a comparative example hereof.

In Comparative Examples 1 to 3, negative electrodes were prepared in the following manner. The negative electrode mixture was prepared in the same way as in Examples 1 to 8 whereas a 1 mm-diameter copper bar was used as the negative-electrode current collector. As shown in FIG. 2, the negative electrode mixture 2a was press-fitted around the bar-like negative-electrode current collector 2b in each predetermined thickness. Thus were prepared the negative electrodes 2 with outside diameters shown in Table 1 as below.

The alkaline secondary batteries were fabricated in the same manner as in Examples 1 to 8, except for that the negative electrodes 2 thus prepared were used.

For each of the alkaline secondary batteries of Comparative Examples 1 to 3, the ratio (Qa/Qc) of a theoretical capacity Qa of each negative electrode to that Qc of the positive electrode as well as the amount of alkaline electrolyte solution poured into each alkaline secondary battery were determined in the same way as in Examples 1 to 8. The results are shown in Table 1 as below.

The fabricated alkaline secondary batteries of Examples 1 to 8 and Comparative Examples 1 to 3 were each subject to 30 charge/discharge cycles. One charge/discharge cycle consisted of charging the battery at a charge current of 200 mA to a battery voltage of 1.95V, followed by discharging the battery at a discharge current of 200 mA to a battery voltage of 1.0V. For each alkaline secondary battery, a battery capacity Q1 on the first cycle and a battery capacity Q30 on the 30th cycle were determined. The results are also shown in Table 1 as below.

TABLE 1

| | negative electrode (mm) | | | | | amount of alkaline electrolyte solution (g) | battery capacity | |
|---|---|---|---|---|---|---|---|---|
| | outside diameter | inside diameter | V2/V1 | d/D | Qa/Qc | | Q1 | Q30 |
| Example 1 | 6.0 | 1.0 | 0.03 | 0.58 | 3.5 | 2.7 | 1000 | 660 |
| Example 2 | 6.0 | 1.9 | 0.10 | 0.58 | 3.2 | 2.8 | 1000 | 790 |
| Example 3 | 6.0 | 2.8 | 0.22 | 0.58 | 2.8 | 2.9 | 1010 | 820 |
| Example 4 | 6.0 | 3.6 | 0.36 | 0.58 | 2.3 | 3.2 | 1020 | 810 |
| Example 5 | 6.0 | 4.6 | 0.60 | 0.58 | 1.5 | 3.3 | 1010 | 800 |
| Example 6 | 6.0 | 4.8 | 0.64 | 0.58 | 1.3 | 3.4 | 1000 | 730 |
| Example 7 | 7.0 | 2.2 | 0.10 | 0.68 | 4.0 | 2.7 | 1020 | 840 |
| Example 8 | 7.8 | 2.4 | 0.10 | 0.76 | 5.0 | 2.6 | 1040 | 780 |
| Comparative Example 1 | 6.0 | — | — | 0.58 | 3.5 | 2.5 | 1000 | 430 |
| Comparative Example 2 | 7.0 | — | — | 0.68 | 4.8 | 2.3 | 1010 | 380 |
| Comparative Example 3 | 7.8 | — | — | 0.76 | 6.0 | 2.1 | 1040 | 310 |

According to the results, each of the alkaline secondary batteries of Examples 1 to 8, wherein each negative electrode 2 included the central cavity for holding the alkaline electrolyte solution 5, achieved dramatic improvement in the charge/discharge cycle performance with notably reduced decline in the battery capacity Q30 on the 30th cycle, as compared with the alkaline secondary batteries of Comparative Examples 1 to 3 wherein each negative electrode 2 included the bar-like negative-electrode current collector 2b at the center thereof.

A comparison was made among the alkaline secondary batteries of Examples 1 to 6 each having the negative electrode 2 with the 6.0 mm outside diameter. The batteries of Examples 2 to 5, wherein each negative electrode had the inside diameter in the range of 1.9 to 3.6 mm and the ratio (=V2/V1) of the volume V2 of the central cavity to that V1 of the negative electrode minus the central cavity in the range of 0.10 and 0.60, achieved even greater improvement in the charge/discharge cycle performance with even smaller decline in the battery capacity Q30 on the 30th cycle, as compared with the battery of Example 1 having the volume ratio of less than 1.10 and the battery of Example 6 having the volume ratio of greater than 0.60.

Further, a comparison was made among the alkaline secondary batteries of Examples 2, 7 and 8 wherein the ratio of the volume of the central cavity to the volume of the negative electrode minus the central cavity was at 0.1. In the battery of Example 8 having the negative electrode 2 of the greatest outside diameter d and the ratio d/D of 0.76, the battery capacity Q1 on the first cycle was great but the battery capacity Q30 on the 30th cycle was comparable to that of the battery of Example 2 having the negative electrode of the smallest outside diameter d and the ratio d/D of 0.58. This is because the gap between the positive electrode 1 and the negative electrode 2 was so small that the reduced amount of alkaline electrolyte solution was poured into the battery. In contrast, the battery of Example 7, which had the negative electrode of an intermediate outside diameter d and the d/D ratio of 0.68, presented a relatively great battery capacity Q1 on the first cycle and suffered less decline in the battery capacity Q30 on the 30th cycle. Thus, the battery of Example 7 achieved the sufficient battery capacity and excellent charge/discharge cycle performance.

EXAMPLE 9

In Example 9, an alkaline secondary battery was fabricated in the same manner as in Example 3, except for that the negative electrode 2 was prepared by using an indium-plating-free copper lath as the negative-electrode current collector 2b.

Similarly to the above, the alkaline secondary batteries of Examples 3 and 9 were each subject to a first charge/discharge cycle, which consisted of charging at the charge current of 200 mA to the battery voltage of 1.95V and then discharging at the discharge current of 200 mA to the battery voltage of 1.0V. Subsequently, each of the batteries was charged in the same manner as in the first cycle. In this state, the alkaline batteries were stored at 60° C. for 14 days. Then, the batteries were studied on respective residual capacity ratios thereof.

According to the results, the alkaline secondary battery of Example 3, which employed the indium-plated copper lath as the negative-electrode current collector 2b, presented a residual capacity ratio of 85%. On the other hand, the alkaline secondary battery of Example 9, which employed the indium-plating-free copper lath as the negative-electrode current collector 2b, presented the lower residual capacity ratio of 54%.

It is believed that the indium-plated copper lath, which the alkaline secondary battery of Example 3 used as the negative-electrode current collector 2b, served to suppress the hydrogen gas evolution in the negative electrode 2 thereby preventing the self-discharge of the negative electrode 2 when the charged battery was stored at high temperature. In contrast, the indium plating-free copper lath, which the battery of Example 9 used as the negative-electrode current collector 2b, detrimentally permitted the hydrogen gas evolution and the self-discharge of the negative electrode 2 when the charged battery was stored at high temperature.

Although the present invention has been fully described by way of examples, it is to be noted that various changes and modifications will be apparent to those skilled in the art. Therefore, unless otherwise such changes and modifications depart from the scope of the present invention, they should be construed as being included therein.

What is claimed is:

1. An alkaline secondary battery comprising a positive electrode, a zinc based negative electrode, and an alkaline electrolyte solution, wherein said positive electrode includes a central cavity for receiving the zinc based negative electrode, the negative electrode includes a central cavity for holding the alkaline electrolyte solution, and the positive electrode presents a smaller capacity than the negative electrode at least in an initial charge/discharge period, wherein said positive electrode employs a positive electrode material whose crystal structure is transformed into a γ-NiOOH structure when charged.

2. The alkaline secondary battery of claim 1, wherein said positive electrode, negative electrode and alkaline electrolyte solution are contained in a battery case, and this battery case contains not less than 70 vol %, in total, of positive electrode material for the positive electrode and negative electrode material for the negative electrode.

3. The alkaline secondary battery of claim 1, wherein the ratio (V2/V1) of a volume V2 of the negative electrode cavity for holding the alkaline electrolyte solution to a volume V1 of the negative electrode minus the cavity for holding the alkaline electrolyte solution is in the range of 0.10 to 0.60.

4. The alkaline secondary battery of claim 1, wherein a negative-electrode current collector permitting bi-directional passage of the alkaline electrolyte solution is disposed on an inside surface of the negative electrode including the cavity for holding the alkaline electrolyte solution.

5. The alkaline secondary battery of claim 4, wherein said negative-electrode current collector is plated with indium.

6. The alkaline secondary battery of claim 3, wherein a negative-electrode current collector permitting bi-directional passage of the alkaline electrolyte solution is disposed on an inside surface of the negative electrode including the cavity for holding the alkaline electrolyte solution.

7. The alkaline secondary battery of claim 6, wherein said negative-electrode current collector is plated with indium.

8. The alkaline secondary battery of claim 1, wherein the ratio (d/D) of an outside diameter d of said negative electrode to an inside diameter D of said positive electrode including the central cavity satisfies the following condition:

$$0.58 < d/D < 0.76.$$

9. The alkaline secondary battery of claim 8, wherein a negative-electrode current collector permitting bi-directional passage of the alkaline electrolyte solution is disposed on an inside surface of the negative electrode including the cavity for holding the alkaline electrolyte solution.

10. The alkaline secondary battery of claim 9, wherein said negative-electrode current collector is plated with indium.

* * * * *